(No Model.)

W. ELLIS.
INFLATION TUBE FOR PNEUMATIC TIRES.

No. 558,552. Patented Apr. 21, 1896.

Witnesses,
E. S. Poole
H. L. Mark

Inventor
Walter Ellis,
by
Edgar Tate Co.
Atty's

United States Patent Office.

WALTER ELLIS, OF KINGSTON-UPON-HULL, ENGLAND.

INFLATION-TUBE FOR PNEUMATIC TIRES.

SPECIFICATION forming part of Letters Patent No. 558,552, dated April 21, 1896.

Application filed January 10, 1895. Serial No. 534,498. (No model.) Patented in England October 31, 1894, No. 20,838, and in France November 13, 1894, No. 229,849.

*To all whom it may concern:*

Be it known that I, WALTER ELLIS, a citizen of the Kingdom of Great Britain and Ireland, residing at the town of Kingston-upon-Hull, in the county of Hull, England, have invented an Improvement in Inflation-Tubes for Pneumatic Tires, (for which I have obtained patents in Great Britain, dated October 31, 1894, No. 20,838, and in France, dated November 13, 1894, No. 229,849;) and I do hereby declare that the following is a full, clear, and exact description of the invention, which will enable others skilled in the art to which it appertains to use the same.

My invention relates to air-tight and valveless metal air-tubes for inflating elastic tubes surrounding wheels, and has for its object to provide a device of this nature which shall be simple of construction, ready of operation, and which shall act to effectually retain air under pressure.

Figure 3:
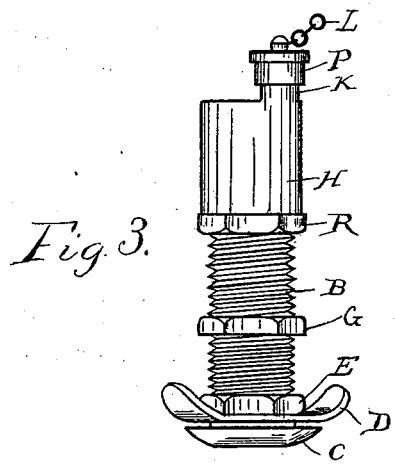
Figure 1:
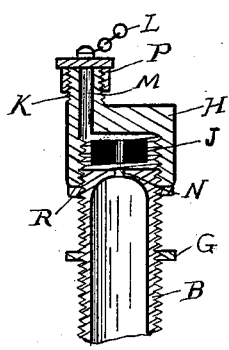
Figure 2:
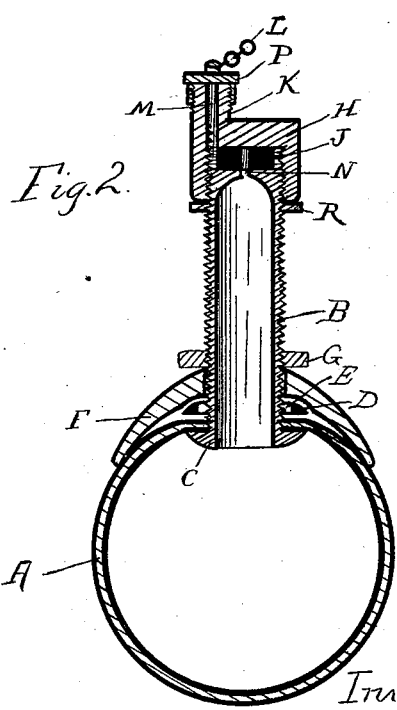

In the drawings, Figure 1 is a vertical section of a portion of a tube provided with a washer and cap in accordance with my invention. Fig. 2 is a transverse section of a wheel-rim provided with a tire equipped with my invention, and Fig. 3 is a vertical elevation of an entire air-tube.

Referring now to the drawings, A represents an inflatable tire seated in a wheel-rim F and provided with an externally-threaded metallic tube B, having its enlarged end C passed through an opening in the under side of the tire and a similar opening in the rim registering therewith.

To retain the tube in place, a plate D, having its ends bent backwardly, is placed upon the tube B and is pressed against the outside of the tire by means of a nut G turned onto the tube. This tube B has its outer end closed, save for a perforation N in the center thereof, and against the surface of this is seated a washer J, having a perforation coinciding with the said perforation in the tube B. Secured onto the end of the tube B is a cap H, provided with a check-nut R to limit its movement and to clamp it against accidental displacement. This cap is provided with a stem K at one side, having a perforation M, which leads to the space occupied by the washer J and opening thereinto at one edge of the latter. A dust-cap P is turned onto the screw-threaded nut of the stem K to prevent ingress of objectionable matter.

The operation of my device is as follows: The dust-cap P being removed, the check-nut R is loosened and the cap H slightly turned backward, when a pump is attached and the tire is inflated, the air first passing over the top of and through the perforation in the washer J and thence from the perforation in the air-tube to the tire.

When a sufficient pressure has been secured in the tire, the cap H is screwed downwardly until it engages the washer J and presses it tightly against the end of the air-tube, the roof of the cap H completely sealing the perforation in the washer. The pump may be then removed, the dust-cap P screwed into place, and the check-nut turned up against the edge of the cap H to retain it in position.

When it is desired to deflate the tire, the cap H is turned upwardly and the air, passing through the perforation in the washer J, passes across the outer face of the washer and through the stem K, the dust-cap P having been previously removed.

It will be noted that when a continuous washer is employed it must be of lesser diameter than that of the end of the tube which it covers, in order that it may not close the opening in the latter when air is being forced in; also, when the washer is formed with a perforation said perforation should be central, as shown, and register at all times with the perforation in the tube B, as otherwise the washer would be liable to slip sidewise and prevent the passage of air into the tire.

It will be readily understood that the particular construction shown in the drawings may be varied without departing from the spirit of my invention, and that I may use different forms involving the principle herein set forth.

Having now described my invention, what I claim is—

In a device of the class described, the combination of an air-tube, an externally-threaded metallic tube having an enlarged end inserted in said air-tube, a plate having its ends bent backwardly and fitted loosely over the threaded tube and against the outside of the air-tube, a nut turned onto the threaded tube and adapted to clamp the said plate in position, a contracted central perforation in the outer end of the threaded tube, a flexible washer concentric with the outer end of said tube and provided with a perforation registering with the perforation in the latter, a cap threaded internally and adapted to be turned onto the outer end of the threaded tube and into engagement with the washer thereon, said cap having an exteriorly-threaded stem at one side provided with a perforation leading to one edge of the said washer, and a dust-cap turned onto said stem.

WALTER ELLIS.

Witnesses:
 THOS. SPURR,
 GEORGE CODLING.